United States Patent [19]
Regan

[11] 3,714,271
[45] Jan. 30, 1973

[54] PRODUCTION OF POLYFLUOROPROPANOLS

[75] Inventor: Bernard M. Regan, Chicago, Ill.

[73] Assignee: Baxter Laboratories, Inc., Morton Grove, Ill.

[22] Filed: July 27, 1970

[21] Appl. No.: 58,687

Related U.S. Application Data

[60] Continuation-in-part of Ser. No. 787,575, Dec. 27, 1968, abandoned, which is a continuation-in-part of Ser. Nos. 667,065, Sept. 12, 1967, Pat. No. 3,431,313, and Ser. No. 663,952, Aug. 29, 1967, Pat. No. 3,499,089, said Ser. No. 667,065, Division of Ser. No. 538,523.

[52] U.S. Cl. ....260/633
[51] Int. Cl. ....C07c 31/34
[58] Field of Search ....260/633

[56] References Cited

UNITED STATES PATENTS

| | | | |
|---|---|---|---|
| 2,917,546 | 12/1959 | Gordon et al. | 260/593 H |
| 3,468,964 | 9/1969 | Swamer | 260/633 |
| 3,189,656 | 6/1965 | Gordon et al. | 260/633 |
| 2,824,897 | 2/1958 | Wujciak et al. | 260/633 |
| 3,418,337 | 12/1968 | Middleton | 260/633 X |
| 3,277,187 | 10/1966 | Dewhirst | 260/633 |

*Primary Examiner*—Howard T. Mars
*Attorney*—Scott J. Meyer

[57] ABSTRACT

1,1,3,3-Tetrafluoropropan-2-ol and 1,1,1,3,3-pentafluoropropan-2-ol are prepared by the vapor phase catalytic halogen hydrogenolysis and carbonyl reduction of perhaloacetones with hydrogen employing a supported palladium on carbon catalyst.

1 Claim, No Drawings

PRODUCTION OF POLYFLUOROPROPANOLS

CROSS-REFERENCE TO RELATED APPLICATIONS

This is a continuation-in-part of co-pending application Ser. No. 787,575, filed Dec. 27, 1968 and now abandoned, which in turn is a continuation-in-part of application Ser. No. 667,065, filed Sept. 12, 1967 now U.S. Pat. No. 3,431,313, and application Ser. No. 663,952, filed Aug. 29, 1967 now U.S. Pat. No. 3,499,089. Application Ser. No. 667,065 is a division of application Ser. No. 538,523, filed Feb. 2, 1966, now U.S. Pat. No. 3,362,874.

This invention relates to a new and improved catalytic process for the preparation of secondary polyfluorinated propanols and, more particularly, to the preparation of the polyfluorinated propan-2-ols: 1,1,3,3-tetrafluoro-,1,1,1,3,3-pentafluoro-, and 1,1,1,3,3,3-hexafluoro-propan-2ol from perhaloacetones.

1,1,3,3-Tetrafluoropropan-2-ol has been recently disclosed in U.S. Pat. No. 3,352,928 as exhibiting exceptionally high solubility for polyamides and as being a useful intermediate for the preparation of anesthetic compounds. It is described in that patent as obtained by reacting 1,1,3,3-tetrafluoroacetone with sodium borohydride at temperatures of about 10°–50° C in the presence of a suitable solvent such as diethylene glycol dimethyl ether. 1,1,3,3-Tetrafluoropropan-2-ol is further disclosed as a useful intermediate for the preparation of other compounds in U.S. Pat. Nos. 3,356,742 and 3,362,874.

1,1,1,3,3-Pentafluoropropan-2-ol is a novel alcohol described and claimed in co-pending application Ser. No. 663,952, filed Aug. 29, 1967. It is useful as a solvent, particularly for compounds that contain receptive sites for its strong hydrogen-bonding donor properties. Among these compounds are polymers such as polyformaldehyde, nylon and other polyamides, polyacrylonitrile, polyvinyl alcohol and polyesters. This alcohol also is useful as a solvent for natural products containing amide, amino, ester, alcohol or ketone groups, and as an intermediate for the preparation of anesthetic compounds.

1,1,1,3,3,3-Hexafluoropropan-2-ol is disclosed as a useful surfactant and emulsifying agent in Belgian Pat. No. 634,368. It is also known as a solvent for certain polymeric materials, for example, the vinyl carboxylate polymers disclosed in U.S. Pat. No. 3,153,004, as an intermediate for the preparation of various polymeric materials, for example, the hexafluoroisopropyl acrylate polymers disclosed in U.S. Pat. No. 3,177,187, and as an intermediate for the preparation of 2,4'-bis-(hexafluoroisopropyl) diphenyl sulfone dicarboxylate, which is a heat transfer fluid and high temperature lubricant described in U.S. Pat. No. 3,324,169. 1,1,1,3,3,3-Hexafluoropropan-2-ol also is useful as an intermediate for the preparation of anesthetic compounds as disclosed in U.S. Pat. No. 3,346,448.

The known methods of producing 1,1,1,3,3,3-hexafluoropropan-2-ol involve the reduction of hexafluoroacetone with sodium borohydride as described in U.S.S.R. Pat. No. 138,604, isopropyl magnesium bromide as described by Knunyants et al., *Bull. Acad. Sci.* (U.S.S.R.), Div. Chem. Sci. (In Eng.), at page 663 (1962), and lithium aluminum hydride as described in U.S. Pat. No. 3,227,674, or with hydrogen employing a metallic copper and chromium oxide catalyst as described in Belgian Pat. No. 634,368, an unsupported platinum oxide catalyst as described by Middleton and Lindsey, *J. Am. Chem. Soc'y.*, Vol. 86, pp. 4,948–4,952 (1964), and a supported palladium on aluminum oxide pellets catalyst as described in Netherlands patent application 6,610,936.

It is an object of the present invention to provide a new and improved catalytic process for the preparation of secondary polyfluorinated propanols.

It is another object of the present invention to provide a new and improved catalytic process for the preparation of the polyfluorinated propan-2-ols: 1,1,3,3-tetrafluoro-, 1,1,1,3,3-pentafluoro-, and 1,1,1,3,3,3-hexafluoro-propan-2-ol from perhaloacetones.

It is a further object of the present invention to provide a new and improved catalytic process for the preparation of 1,1,1,3,3,3-hexafluoropropan-2-ol in high yields by the carbonyl reduction of 1,1,1,3,3,3-hexafluoroacetone.

It is still another object of the present invention to provide a new and improved catalytic process for the preparation of 1,1,3,3-tetrafluoropropan-2-ol and 1,1,1,3,3-pentafluoropropan-2ol in high yields by the simultaneous halogen hydrogenolysis and carbonyl reduction of halogenated polyfluoroacetones.

In brief, the present invention consists of a process for the preparation of 1,1,3,3-tetrafluoro-, 1,1,1,3,3-pentafluoro-, and 1,1,1,3,3,3-hexafluoro-propan-2-ol comprising the vapor phase catalytic reduction of, respectively, 1,3-dihalo-1,1,3,3-tetrafluoroacetone, 3-halo-1,1,1,3,3-pentafluoroacetone and 1,1,1,3,3,3-hexafluoroacetone with hydrogen employing a supported palladium on carbon catalyst. In this process, halo- is defined to mean bromo- or chloro-, and pre- preferably is chloro-.

The process of this invention can be represented by the following general equation:

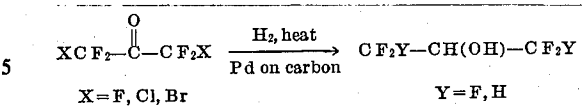

$$XCF_2-\overset{O}{\overset{\|}{C}}-CF_2X \xrightarrow[\text{Pd on carbon}]{H_2,\text{ heat}} CF_2Y-CH(OH)-CF_2Y$$

$X = F, Cl, Br$   $Y = F, H$

In one particular aspect, the process of this invention comprises the simultaneous halogen hydrogenolysis and carbonyl reduction of, respectively, 1,3-dihalo-1,1,3,3-tetrafluoroacetone and 3-halo-1,1,1,3,3-pentafluoroacetone wherein halogen is defined to mean bromine or chlorine, and preferably is chlorine. In this particular aspect of the inventive process, the halogen hydrogenolysis which accompanies the carbonyl reduction unexpectedly results in replacement of bromine or chlorine, but not fluorine, with hydrogen. Moreover, in this particular aspect of the invention in which acid is produced as a by-product, the palladium on carbon catalyst provides an advantage in resistance to acid which is not exhibited by a palladium on alumina catalyst such as described in Netherlands patent application 6,610,936.

The criticality of the particular catalyst employed in this invention is further evident since it is known that use of an unsupported platinum oxide catalyst for the reduction of 1,3-dichloro-1,1,3,3-tetrafluoroacetone produces 1,3-dichloro-1,1,3,3-tetrafluoropropanol instead of the 1,1,3,3-tetrafluoropropanol desired herein, as seen from U.S. Pat. No. 3,189,656.

It is important to the process of this invention that a fresh, active catalyst be employed, i.e., one that has not been deactivated such as by previous use in a catalytic reaction without subsequent reactivation and has not been poisoned such as may occur during storage under normal atmospheric conditions. The employment of a used or deactivated palladium on carbon catalyst in the reaction with a halogenated polyfluoroacetone produces a polyfluoroacetone instead of the polyfluoropropanol desired herein, as seen from U.S. Pat. No. 2,917,546.

Generally, the amount of palladium in the catalyst ranges from about 0.1 percent to about 5 percent by weight palladium. Preferably, the catalyst consists of a 2 percent by weight palladium on 4–12 mesh carbon granules which is dehydrated immediately prior to use by heating in a tube to about 300° C in a stream of dry nitrogen followed by pure hydrogen.

A suitable method for preparing the catalyst of this invention comprises impregnating a carbon support material, e.g., 4–12 mesh carbon granules previously washed with deionized water, with an aqueous solution of palladium chloride containing an oxidizing agent, e.g., hydrogen peroxide, to precipitate metallic palladium on the carbon granules, followed by washing and drying of the catalyst, such as described in U.S. Pat. No. 3,138,560.

A 2 percent by weight palladium on 4–8 or 4–12 mesh carbon granules catalyst commercially available from Engelhard Industries has been found to be eminently suitable in the practice of the process of this invention.

Under the preferred process conditions, the perhaloacetone is catalytically reacted with an excess of hydrogen at temperatures of from about 180° C to about 225° C for a contact time of from about 1 to about 30 seconds, followed by recovery of the desired reaction product.

It is preferred that a molar excess of at least about 40 percent hydrogen be employed in this reaction. For example, in the preparation of the tetrafluoropropanol, it is preferred to use from about 4 to about 6 moles of hydrogen per mole of 1,3-dichlorotetrafluoroacetone instead of the three moles of hydrogen as required by theory.

Contact or reaction times of from about 5 to about 20 seconds, and preferably 10–20 seconds generally are suitable for the desired halogen hydrogenolysis and carbonyl reduction of 1,3-dichlorotetrafluoroacetone and monochloropentafluoroacetone. A contact time of about 3 seconds usually is sufficient for the desired carbonyl reduction of hexafluoroacetone.

Employing the above conditions, the weight ratio of perhaloacetone to palladium generally ranges from about 200:1 to about 1,000:1.

A particularly desirable reaction procedure for the practice of this invention comprises passing a mixture of the appropriate perhaloacetone and hydrogen vapors through the catalyst contained in a Pyrex or nickel tube and condensing the reactant vapors in a suitable trap cooled to about −70°C such as by Dry Ice.

The secondary polyfluorinated propanols prepared in accordance with the foregoing procedures generally contain small amounts of water and acidic impurities. If desired, these acidic impurities can be removed by contact with an alkaline reagent such as sodium carbonate or sodium bicarbonate. Subsequent distillation from concentrated sulfuric acid or a mixture of concentrated sulfuric acid and a small amount of $P_2O_5$ can be employed to remove water from these propanols. Still other methods of purification can be used as will be apparent to those skilled in the art.

The following examples will further illustrate the invention although the invention is not limited to these specific examples. All percentages and parts herein are on a weight basis unless otherwise indicated.

EXAMPLE I 1,1,3,3-Tetrafluoropropan-2-ol a. Hydrogen at the rate of one-half liter per minute was bubbled through 1,3-dichloro-1,1,3,3-tetrafluoroacetone at −4° C. The mixture of vapors passed through a Pyrex tube (45 cm. × 1.9 cm. i.d.) containing 2 percent palladium on carbon granules (4–12 mesh) and heated to 200° C. The reaction products were condensed in a trap cooled by Dry Ice. A 750:1 ratio by weight of dichloro-tetrafluoroacetone to palladium is optimum.

In a typical run 1,250 grams (6.28 moles) of dichlorotetrafluoroacetone was vaporized with hydrogen during 22 hours and the mixture passed over 85 grams of the palladium-carbon catalyst. Fractional distillation of the reaction products gave 704 grams (5.33 moles, 85 percent of theory) of 1,1,3,3-tetrafluoropropan-2-ol, b.p. 106°–109° C at atmospheric pressure.

b. Similarly, 1042 grams (5.25 moles) of 1,3-dichlorotetrafluoroacetone was vaporized during 23 hours with a hydrogen flow of 0.4 liter per minute. The vapor mixture passed through 88 grams of the palladium-carbon catalyst heated to about 185° C. Fractional distillation of the reaction products gave 588 grams of 1,1,3,3-tetrafluoropropan-2-ol, b.p. 106.5° to 108° C, $n_D^{19}$ 1.333, which was found to be 95 percent pure by gas-liquid chromatography.

The structure of this alcohol, $CHF_2—CH(OH)—CHF_2$, was confirmed by proton nuclear magnetic resonance analysis. Its infrared spectrum was identical to that of the alcohol, b.p. 107°–109° C, $n_D^{19}$ 1.333, prepared by sodium borohydride reduction of 1,1,3,3-tetrafluoroacetone essentially as described in U.S. Pat. No. 3,352,928.

c. Hydrogen at a rate of 1.0 to 1.2 liters per minute bubbling through 1,3-dichlorotetrafluoroacetone at 0° to −4° C vaporized 875 grams (4.4 moles) during 9.5 hours. The vapor mixture passed through 195 grams of the palladium-carbon catalyst in a nickel tube (85 cm. × 2.5 cm. i.d.) heated to about 185° C. Fractional distillation of the reaction product gave 534 grams of 1,1,3,3-tetrafluoropropan-2-ol, $b_{760}$ 106°-108° C.

EXAMPLE II 1,1,1,3,3-Pentafluoropropan-2-ol a. Hydrogen at the rate of one liter per minute and the vapor of chloropentafluoroacetone at the rate of 1.5 grams per minute were mixed and passed through a Pyrex tube (45 cm. × 1.9 cm. i.d.) containing 2 percent palladium on carbon granules (4–12 mesh) and heated to 180° C. The reaction products were condensed in a trap cooled by Dry Ice.

In a typical run 480 grams (2.63 moles) of chloropentafluoracetone was vaporized with hydrogen during 5.5 hours, and the mixture passed over 85 grams of palladium-carbon catalyst. Fractional distillation of the 358 grams of reaction products gave 258 grams (1.72 moles, 65 percent of theory) of 1,1,1,3,3-pentafluoropropan-2-ol, b.p. 81° C. The structure of this alcohol, $CF_3$—CH(OH)—$CHF_2$, was confirmed by proton nuclear magnetic resonance and infrared spectra.

Analysis for $C_3H_3F_5O$-Calc'd: C,24.01%; H, 2.04%.
Found: C, 23.99%; H, 2.19%.

b. Similarly, hydrogen at a rate of 1.0–1.2 liters per minute and 1,358 grams (7.45 moles) of chloropentafluoroacetone at a rate of about 1.4 grams per minute were combined and passed for 16 hours through 88 grams of the palladium-carbon catalyst in a Pyrex tube (45 cm. × 1.9 cm. i.d.) heated to about 210°–220° C. The reaction product was collected in a trap cooled to −70° C. Fractional distillation of the product gave 803 grams of 1,1,1,3,3-pentafluoropropan-2-ol, $b_{760}$ 79.5°–81.7° C, which by gas-liquid chromatographic analysis was better than 95 percent pure.

EXAMPLE III 1,1,1,3,3,3-Hexafluoropropan-2-ol

Hydrogen at a rate between 2.2 and 2.5 liters per minute and 455 grams (2.74 moles) of hexafluoroacetone at a rate of about 2.8 grams per minute were combined and passed for 2.75 hours through 85 grams of the 2 percent palladium on carbon granules (4–12 mesh) in a Pyrex tube (45 cm. × 1.9 cm. i.d.) heated to about 200° C. Fractional distillation of the reaction produce gave 353 grams of 1,1,1,3,3,3-hexafluoropropan-2-ol, $b_{760}$ 56.6°–58.9° C.

This alcohol was identified by comparison with a commercially available sample of hexafluoroisopropanol. Their infrared spectra were substantially identical, an they had the same gas-liquid chromatographic retention times. Proton nuclear magnetic resonance spectra of this alcohol confirmed the $CF_3$—CH(OH)—$CF_3$ structure.

The addended Table 1 summarizes the reaction conditions employed in the above examples and the excellent yields of the desired secondary polyfluorinated propanols.

Various other modifications and examples will be apparent to the person skilled in the art after reading the foregoing specification and appended claims without departing from the spirit and scope of the invention. All such modifications and examples are included within the scope of the invention.

TABLE 1.—PREPARATION OF POLYFLUOROPROPAN-2-OLS

| Example | Reactants | $H_2$/ ketone, molar ratio | Ketone/ Pd, weight ratio | Temperature, ° C. | Contact time, sec. | Product | B.P., ° C. | Yield, percent theory |
|---|---|---|---|---|---|---|---|---|
| I | $CF_2Cl$—CO—$CF_2Cl+H_2+Pd$ | 4.3 | 735 | 200 | 13 | $CHF_2$—CH(OH)—$CHF_2$ | 106–109 | 80 |
| Ib | Same as above | 4.3 | 590 | 185 | 16 | Same as above | 106.5–108 | 80 |
| Ic | do | 5.7 | 225 | 185 | 20 | do | 106–108 | 85 |
| IIa | $CF_3$—CO—$CF_2Cl+H_2+Pd$ | 5.0 | 280 | 180 | 6.5 | $CF_3$—CH(OH)—$CHF_2$ | 81 | 65 |
| IIb | Same as above | 5.6 | 770 | 210–220 | 6 | Same as above | 79.5–81.7 | 68 |
| IIc | do | 5.0 | 560 | 210–225 | 13 | do | 79.6–81.8 | 84 |
| III | $CF_3$—CO—$CF_3+H_2+Pd$ | 5.6 | 270 | 200 | 3 | $CF_3$—CH(OH)—$CF_3$ | 56.6–58.9 | 75 |

c. Hydrogen at a rate of 1.5 liters per minute and 2,280 grams (12.5 moles) of chloropentafluoroacetone at a rate of about 2.2 grams/minute were combined and passed for 17.5 hours through 203 grams of the 2 percent palladium-carbon catalyst in a nickel tube (85 cm. × 2.5 cm. i.d.) heated to about 210°–225° C. The reaction product was collected in a trap cooled to −70° C. Fractional distillation of the product gave 1,654 grams of 1,1,1,3,3-pentafluoropropan-2-ol, $b_{760}$ 79.6°–81.8° C of 95 percent purity by gas-liquid chromatographic analysis.

What is claimed is:

1. A process for the preparation of 1,1,1,3,3-pentafluoro-2-propanol comprising the simultaneous vapor phase catalytic halogen hydrogenolysis and carbonyl reduction of 3-halo-1,1,1,3,3-pentafluoroacetone with a molar excess of at least about 40 percent hydrogen employing a fresh catalyst comprising from about 0.1 percent to about 5 percent by weight palladium on carbon granules at a reaction temperature of from about 180° C to about 225° C and a contact time of from about one to about 30 seconds wherein said halo- is selected from the group consisting of bromo- and chloro-.

* * * * *